US011202205B2

United States Patent
Banyay et al.

(10) Patent No.: US 11,202,205 B2
(45) Date of Patent: Dec. 14, 2021

(54) COMPUTER-IMPLEMENTED IDENTIFICATION METHOD

(71) Applicant: FORD GLOBAL TECHNOLOGIES, LLC, Dearborn, MI (US)

(72) Inventors: Matus Banyay, Frechen (DE); Martin Scheck, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 16/552,513

(22) Filed: Aug. 27, 2019

(65) Prior Publication Data

US 2020/0077256 A1    Mar. 5, 2020

(30) Foreign Application Priority Data

Aug. 29, 2018  (DE) .................... 10 2018 214 632.2

(51) Int. Cl.
| | |
|---|---|
| *G06F 21/00* | (2013.01) |
| *H04W 12/69* | (2021.01) |
| *H04W 12/08* | (2021.01) |
| *H04W 12/63* | (2021.01) |
| *H04W 12/65* | (2021.01) |

(52) U.S. Cl.
CPC .......... *H04W 12/69* (2021.01); *H04W 12/08* (2013.01); *H04W 12/63* (2021.01); *H04W 12/65* (2021.01)

(58) Field of Classification Search
CPC ....... H04W 4/38; H04W 12/00; H04W 12/08; H04W 12/06; H04W 12/69; H04W 12/63; H04W 12/65; G06F 21/60; G06F 21/30

USPC .......................................................... 726/19
See application file for complete search history.

(56) References Cited

U.S. PATENT DOCUMENTS

| | | | | |
|---|---|---|---|---|
| 8,321,684 | B2 * | 11/2012 | Mumm | H04M 3/38 |
| | | | | 713/186 |
| 9,867,015 | B1 * | 1/2018 | Mukhtar | G01C 21/165 |
| 10,034,135 | B1 * | 7/2018 | Provost | H04W 4/025 |
| 10,075,846 | B1 * | 9/2018 | Acar | H04L 63/0861 |
| 2011/0165861 | A1 * | 7/2011 | Wilson | H04M 1/72457 |
| | | | | 455/411 |
| 2012/0117020 | A1 * | 5/2012 | Davis | G16H 10/60 |
| | | | | 706/54 |
| 2014/0181910 | A1 * | 6/2014 | Fingal | H04L 63/107 |
| | | | | 726/4 |
| 2016/0034659 | A1 * | 2/2016 | Lamb | A61B 5/4833 |
| | | | | 702/19 |
| 2016/0161339 | A1 * | 6/2016 | Tan | G01J 5/026 |
| | | | | 702/150 |
| 2016/0182502 | A1 * | 6/2016 | Smith | H04L 63/0884 |
| | | | | 726/7 |
| 2016/0277528 | A1 * | 9/2016 | Guilaume | H04L 67/12 |

(Continued)

*Primary Examiner* — Josnel Jeudy
(74) *Attorney, Agent, or Firm* — Michael J. Spenner; Brooks Kushman P.C.

(57) ABSTRACT

An identity of a user may be verified using a computer-implemented identification. User-specific sensor data arising through use of the portable computer by the user is collected from sensors of a portable computer. A user profile is prepared based on the user-specific user data. Current sensor data is read in, from the sensors, representative of current usage of the portable computer. The current sensor data is compared with the user profile. The identity of the user is confirmed responsive to the current sensor data corresponding to the user profile.

21 Claims, 1 Drawing Sheet

(56) References Cited

U.S. PATENT DOCUMENTS

2016/0380989 A1* 12/2016 Bailey .................. H04W 12/06
                                                    726/5
2018/0074494 A1*  3/2018 Myers ................ G06K 9/00288
2018/0192446 A1*  7/2018 Skobov ................ H04W 76/11

* cited by examiner

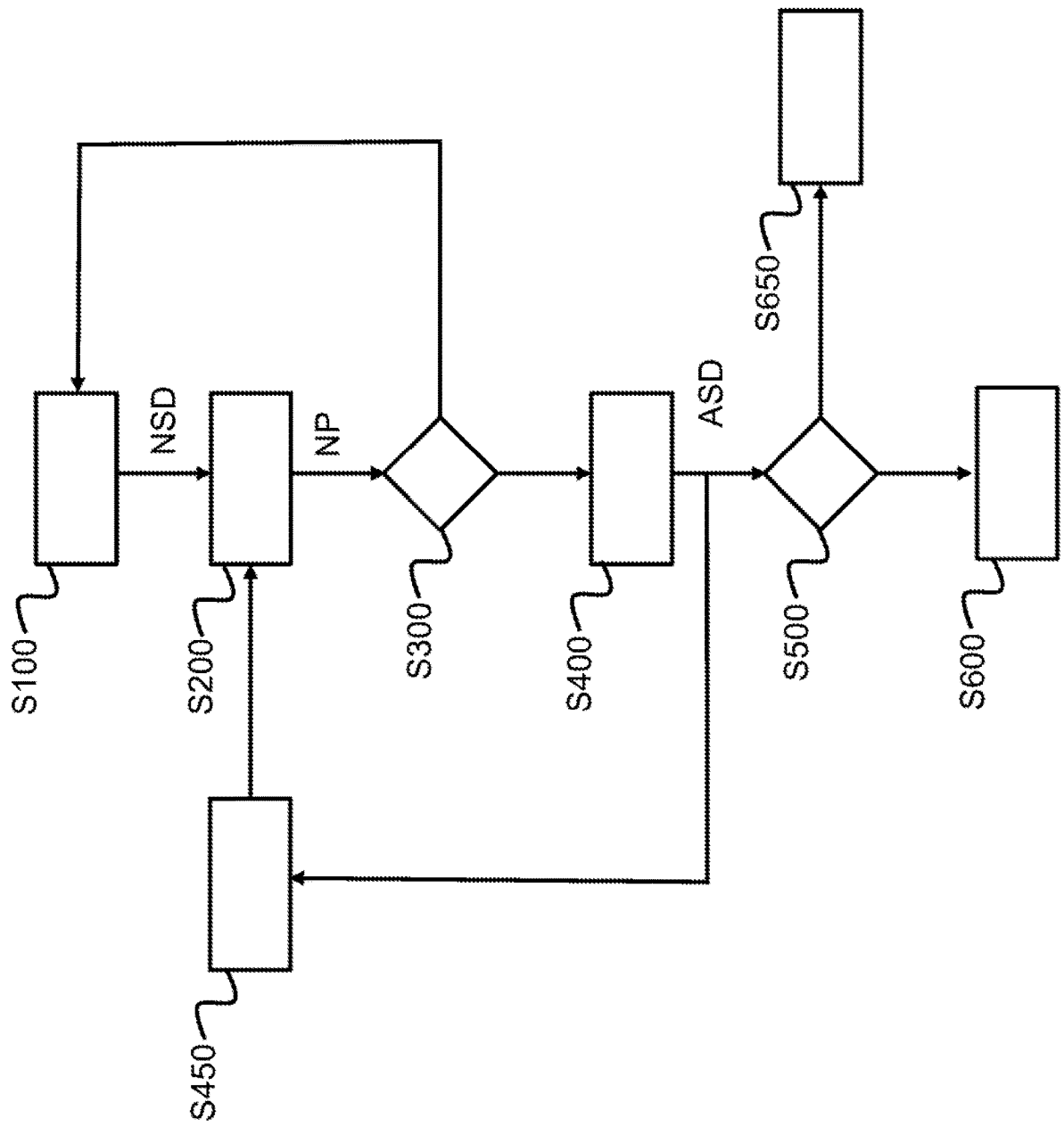

COMPUTER-IMPLEMENTED IDENTIFICATION METHOD

CROSS-REFERENCE TO RELATED APPLICATIONS

This application claims foreign priority benefits under 35 U.S.C. § 119(a)-(d) to DE Application 10 2018 214 632.2 filed Aug. 29, 2018, which is hereby incorporated by reference in its entirety.

TECHNICAL FIELD

The disclosure relates to a computer-implemented identification method.

BACKGROUND

A user must at present carry with him various documents such as, for example, a vehicle key, a credit card or access cards for door opening systems, in order to substantiate his identity. This is cumbersome, and also takes up space in the user's pocket.

It is therefore the object of the disclosure to provide a method with which an identification of this sort can be simplified.

The object is achieved through a computer-implemented identification method for verifying an identity of a user, with the steps of: collecting user-specific sensor data, preparing a user profile based on the user-specific user data, reading in current sensor data, comparing the current sensor data with the user profile, and confirming the identity of the user if the current sensor data correspond to the user profile.

For this purpose the user uses a portable computer such as, for example, a hand-held device, such as a smart phone, or a wearable computer, such as a smart watch. In a first phase of the method, user-specific sensor data arising through the use of the portable computer by the user is collected. The collection of the user-specific user data extends over a relatively long period of time. The collected user data are evaluated in order to prepare a user profile. In a second phase, current sensor data that are representative of the current usage of the portable computer is then read in for the actual verification of the user. The period of time within which the current user data are captured is here shorter than the period of time within which the user-specific user data are captured. The current user data are then compared with the user profile. If the result of the comparison is that the current user data matches the user profile, the identity of the user is confirmed. Otherwise, a comparison can be made with another user profile, or other identification methods are carried out. The identification of a user can be significantly simplified in this way.

SUMMARY

According to one form of embodiment, the user-specific sensor data and the current sensor data are measured values representative of speed values and/or acceleration values. The measured values representative of speed values and/or acceleration values can be captured with speed or acceleration sensors of the portable computer. The measured values representative of speed values and/or acceleration values can, further, be assigned to time or date information. In other words, a time-resolved movement profile is prepared which, for example, comprises regular journeys to a workplace.

According to a further form of embodiment, the user-specific sensor data and the current sensor data are measured values representative of position data and/or direction data. The measured values representative of position data and/or direction data can, for example, be captured with a GPS module of the portable computer. The movement profile can thus be supplemented with places that the user regularly visits such as, for example, a restaurant during a lunch break.

According to a further form of embodiment, the user-specific sensor data and the current sensor data are measured values representative of a temperature value. The measured values representative of a temperature value can be captured with a temperature sensor of the portable computer. The temperature value changes, for example, when entering or leaving heated and/or air-conditioned rooms or means of transport. The movement profile can be thither refined in this way.

According to a further form of embodiment, the user-specific sensor data and the current sensor data are usage data. The usage data arises when logging the portable computer into communication or data networks such as mobile telephony networks, NFC, WLAN or Bluetooth. The movement profile can be further refined in this way too.

According to a farther form of embodiment, the user-specific sensor data and the current sensor data are measured values representative of sound. Measured values representative of sound can be captured with a microphone of the portable computer. These can, for example, be typical ambient noises. The movement profile can yet again be further refined in this way.

According to a further form of embodiment, a determination is made in a further step as to whether the measured values are indicative of an impact noise and, in a further step, a blocking signal is generated if the measured values are indicative of an impact noise. A captured impact noise is then deemed to be indicative of a loss of the portable computer, whereupon the portable computer is blocked.

According to a further form of embodiment, a determination is made in a further step as to whether the measured values are representative of speed values and/or acceleration values indicative of an impact acceleration, and in a further step a blocking signal is generated if the measured values are indicative of an impact acceleration. An acceleration is thus acquired at the beginning of a failing process and an abrupt braking on meeting the floor, this occurring immediately after capturing acceleration values or through the evaluation of acceleration values or profiles. The computer-implemented identification method can, furthermore, use a combination of impact noise and impact acceleration for the generation of a blocking signal. It can, in other words, additionally be provided that together with the impact noises, corresponding acceleration values and patterns are captured that are indicative of the portable computer falling down and meeting a floor. User security can be increased in this way.

According to a further form of embodiment, the user-specific sensor data and the current sensor data are image data. The image data can be obtained with a camera of the portable computer. The image data can be evaluated in terms of the objects represented, such as buildings or places of interest. The movement profile can yet again be refined in this way.

According to a further form of embodiment, a user specifies a threshold value, a value is determined for the degree of a correspondence between the current sensor data and the user profile, and the identity of the user is confirmed if the value for the degree of correspondence is greater than the threshold value. The user can thus specify a variety of security requirements, e.g. through low threshold values for low security requirements, medium threshold values for medium security requirements and high threshold values for high security requirements.

According to a further form of embodiment, the respective current sensor data are added to the user-specific sensor data in a further step, and the user profile is updated on the basis of the updated user data. The database of the user-specific sensor data can thus be extended.

A computer program product for carrying out such a method and a portable computer furthermore belong to the disclosure.

BRIEF DESCRIPTION OF THE DRAWINGS

The disclosure will now be explained with reference to a drawing. Here:

The FIGURE shows a schematic illustration of a flow diagram of the computer-implemented identification method for verifying an identity of a user.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The computer-implemented identification method for verifying an identity of the user takes place through the use of a portable computer that comprises hardware and/or software components for the tasks and/or functions described below.

The portable computer can also be referred to as a mobile device or mobile terminal which, due to its size and its weight, can be carried without great bodily effort and is thus suitable for mobile use.

The portable computer in the present exemplary embodiment is a hand-held device such as a smart phone or a tablet computer. In other words, a hand-held device refers to a portable electronic device for various applications, with power supplied by accumulators or batteries. It is so small and light that it can be held in just one hand while in use.

Differing from the present exemplary embodiment, the portable computer can also be a wearable computer such as, for example, a smart watch. A smart watch refers to an electronic wristwatch which has additional sensors, actuators (e.g., a vibration motor), as well as computer functionalities and connectivities. The portable computer can, in addition, also be designed differently, e.g., as smart glasses et cetera.

In the present exemplary embodiment, the portable computer comprises acceleration and speed sensors, a GPS module, a temperature sensor, a microphone and a camera.

In operation, a user profile NP is prepared in a first phase. User-specific sensor data NSD are collected for this purpose in a first step S100. The user-specific sensor data NSD are captured in operation in part with the said sensors of the portable computer.

The user-specific sensor data NSD are measured values representative of speed values and/or acceleration values that the portable computer experiences. It can, in addition, be provided that the measured values representative of speed values and for acceleration values are linked to time and date information, in order in this way to prepare a time-resolved movement profile that comprises, for example, regular journeys to a workplace of the user.

The user-specific sensor data NSD can, furthermore, be measured values representative of position data and/or direction data of the portable computer. The movement profile is thus supplemented with places that the user regularly visits such as, for example, a restaurant during a lunch break.

The user-specific sensor data NSD can, furthermore, be measured values representative of a temperature value in the surroundings of the portable computer. The temperature value changes when, for example, the user with the portable computer enters or leaves heated and/or air-conditioned rooms or means of transport. The movement profile can be further refined in this way.

The user-specific sensor data NSD can, in addition, be data such as arises when logging the portable computer into communication or data networks such as mobile telephony networks, NFC, WLAN or Bluetooth. The movement profile can be further refined in this way too.

The user-specific sensor data NSD can, furthermore, be measured values representative of sound. These can, for example, be typical ambient noises. It can, however, also be provided that impact noises are captured together with corresponding acceleration values and patterns that are indicative of the computer filling down and meeting a floor. This is then deemed to be indicative of a loss of the portable computer, whereupon the portable computer is blocked from use. User security can be increased in this way.

The user-specific sensor data NSD can, furthermore, be measured values image data. The image data can be evaluated in terms of the objects represented, such as buildings or places of interest. The movement profile can yet again be refined in this way.

In a further step S200 the captured data are evaluated in order to prepare the user profile NP on the basis of the user-specific user data NSD. The user profile NP is thus based on the data arising during use of the portable computer. No additional data input by the user is thus necessary. The capture, collection, and evaluation of the data rather take place in the background, unnoticed by the user.

In the present exemplary embodiment, it is provided that in minimum criterion must be satisfied in a further step S300 for the user profile NP. The minimum criterion can, for example, be a stochastic parameter that is representative of the trustworthiness or reliability of the user-specific user data NSD. In other words, a user profile NP is enabled only when regularly recurring patterns have been acquired in the user-specific user data NSD. If the minimum criterion is not satisfied, the method is continued with the first step S100, and further user-specific user data NSD are captured.

If, on the other hand, the minimum criterion is satisfied, the user profile NP is enabled.

In a second phase of the method, the actual verification of the identity of the user no takes place.

In a further step S400, current sensor data ASD of the portable computer is now read in.

The respective types of the current sensor data ASD correspond to the respective user-specific sensor data NSD. They are, for example, captured in response to a requested verification of the user by the above-mentioned sensors, i.e.

by the acceleration and speed sensors, the GPS module, the temperature sensor, the microphone and/or the camera.

In the present exemplary embodiment, the current sensor data ASD differ from the user-specific sensor data NSD in terms of the duration of the acquisition. The period of time within which the current user data ASD are captured is shorter than the period of time within which the user-specific user data NSD are captured.

It is furthermore provided in the present exemplary embodiment, that, in a further step S450, the respective current sensor data ASD are added to the user-specific sensor data NSD in order in this way to expand the database of the user-specific sensor data NSD. Use can be made for this purpose of learning algorithms which, for example, train a neural network with, for example, deep-learning algorithms.

The current sensor data ASD are compared with the user profile NP in a further step S500.

In a further step S600, the identity of the user is confirmed, e.g., through creating and outputting a confirmation, if the current sensor data ASD correspond to the user profile NP. An evaluation criterion that gives different weights to the said data can be employed here. If a comparison then shows that a value representative of the degree of correspondence between the current sensor data ASD and the user profile NP lies above a preset threshold value, the confirmation is generated and enabled. A complete correspondence it is thus not necessary.

It is to be noted that the user can select different security levels to which different threshold values for the degree of correspondence are then assigned such as, for example, low threshold values for low security requirements, medium threshold values for medium security requirements and high threshold values for high security requirements.

If, on the other hand, the value representative of the degree of correspondence between current sensor data ASD and the user profile NP lies below a preset threshold value, the method is continued with a further step S650.

A comparison with a different user profile can then be provided, or another identification method for verifying the identity of the user carried out.

The identification of a user can be significantly simplified with the described method in this way.

The method can be used, for example, to form a keyless-go system that allows a motor vehicle to be unlocked without the active use of an automobile key—i.e. without key or lock—and to be started with nothing more than actuation of the start button.

The user profile NP is first prepared for this purpose with the aid of the portable computer, and then transferred to the keyless-go system.

As soon as the driver approaches with the portable computer, the keyless-go system becomes active, and compares the user profile NP with the current sensor data ASD.

If the current sensor data ASD correspond to the user profile NP, the identity of the user is confirmed, and the motor vehicle is unlocked and can be started through nothing more than actuation of the start button.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for verifying an identity of a user, comprising:
    collecting, from sensors of a portable computer, user-specific sensor data arising through use of the portable computer by the user, the plurality of sensors including a GPS module;
    preparing a user profile based on the user-specific user data;
    reading in current sensor data, from the sensors, representative of current usage of the portable computer, wherein the user-specific sensor data and the current sensor data include measured values from the plurality of sensors representative of position of the portable computer and/or direction of the portable computer;
    linking the measured values to time and date information, to prepare a time-resolved movement profile of the user profile;
    comparing the current sensor data, including the measured values from the plurality of sensors representative of position of the portable computer and/or direction of the portable computer, with the time-resolved movement profile of the user profile; and
    confirming the identity of the user responsive to the current sensor data corresponding to the time-resolved movement profile of the user profile.

2. The method according to claim 1, wherein the user-specific sensor data and the current sensor data includes measured values from the sensors representative of speed and/or acceleration experienced by the portable computer.

3. The method according to claim 2, further comprising:
    determining whether the measured values are representative of speed values and/or acceleration values indicative of an impact acceleration; and
    generating a blocking signal blocking use of the portable computer responsive to the measured values being indicative of an impact acceleration.

4. The method according to claim 1, wherein the user-specific sensor data and the current sensor data includes measured values from the sensors representative of a temperature of surroundings of the portable computer.

5. The method according to claim 1, wherein the user-specific sensor data and the current sensor data includes usage data indicative of wireless network usage of the portable computer.

6. The method according to claim 1, wherein the user-specific sensor data and the current sensor data includes measured values from the sensors representative of sound in surroundings of the portable computer.

7. The method according to claim 6, further comprising:
    determining whether the measured values are indicative of an impact noise; and
    generating a blocking signal blocking use of the portable computer responsive to the measured values being indicative of an impact noise.

8. The method according to claim 1, wherein the user-specific sensor data and the current sensor data include image data from the sensors of objects in surroundings of the portable computer.

9. The method according to claim 1, further comprising:
    identifying a preset threshold value;
    determining a value representative of a degree of correspondence between the current sensor data and the user profile; and
    confirming the identity of the user responsive to the value for the degree of correspondence being greater than the threshold value.

10. The method according to claim 1, further comprising:
adding the respective current sensor data to the user-specific sensor data to generate updated user data; and
updating the user profile according to the updated user data.

11. A portable computer for verifying an identity of a user, comprising:
a plurality of sensors, the plurality of sensors including a GPS module; and
a hardware processor programmed to execute software instructions to perform operations including to:
collect, from the plurality of sensors, user-specific sensor data arising through use of the portable computer by the user,
prepare a user profile using the user-specific user data,
read in current sensor data, from the plurality of sensors, representative of current usage of the portable computer, wherein the user-specific sensor data and the current sensor data include measured values from the plurality of sensors representative of position of the portable computer and/or direction of the portable computer,
link the measured values to time and date information, to prepare a time-resolved movement profile of the user profile;
compare the current sensor data, including the measured values from the plurality of sensors representative of position of the portable computer and/or direction of the portable computer, with the time-resolved movement profile of user profile, and
confirm the identity of the user if the current sensor data correspond to the time-resolved movement profile of the user profile.

12. The portable computer according to claim 11, wherein the plurality of sensors includes acceleration and/or speed sensors, and the user-specific sensor data and the current sensor data include measured values from the plurality of sensors representative of speed values and/or acceleration values experienced by the portable computer.

13. The portable computer according to claim 11, wherein the hardware processor is further programmed to:
determine whether the measured values are representative of speed values and/or acceleration values indicative of an impact acceleration; and
generate a blocking signal blocking use of the portable computer responsive to the measured values being indicative of an impact acceleration.

14. The portable computer according to claim 11, wherein the plurality of sensors includes a temperature sensor, and the user-specific sensor data and the current sensor data include measured values from the plurality of sensors representative of a temperature of surroundings of the portable computer.

15. The portable computer according to claim 11, the user-specific sensor data and the current sensor data include usage data indicative of wireless network usage of the portable computer.

16. The portable computer according to claim 11, wherein the user-specific sensor data and the current sensor data include measured values from the plurality of sensors representative of sound in surroundings of the portable computer.

17. The portable computer according to claim 16, wherein the hardware processor is further programmed to:
determine whether the measured values are indicative of an impact noise; and
generate a blocking signal blocking use of the portable computer responsive to the measured values being indicative of an impact noise.

18. The portable computer according to claim 11, wherein the plurality of sensors includes a camera, and the user-specific sensor data and the current sensor data include image data from the plurality of sensors of objects in surroundings of the portable computer.

19. The portable computer according to claim 11, wherein the hardware processor is further programmed to:
identify a preset threshold value;
determine a value representative of a degree of correspondence between the current sensor data and the user profile; and
confirm the identity of the user responsive to the value for the degree of correspondence being greater than the threshold value.

20. The portable computer according to claim 11, wherein the hardware processor is further programmed to:
add the respective current sensor data to the user-specific sensor data to generate updated user data; and
update the user profile according to the updated user data.

21. A portable computer for verifying an identity of a user, comprising:
a plurality of sensors; and
a hardware processor programmed to execute software instructions to perform operations including to:
collect, from the plurality of sensors, user-specific sensor data arising through use of the portable computer by the user, the user-specific sensor data including measured values from the plurality of sensors representative of position and direction of the portable computer over time, and a least two of measured values representative of temperature in the surroundings of the portable computer, measured values representative of sound in surroundings of the portable computer, or measured values representative of images of objects in surroundings of the portable computer,
prepare a user profile using the user-specific user data, including to link the measured values to time and date information, to prepare a time-resolved movement profile of the user profile,
read in current sensor data, from the plurality of sensors, representative of current usage of the portable computer,
compare the current sensor data with the user profile to determine a value representative of a degree of correspondence between the current sensor data and the user profile; and
confirm the identity of the user responsive to the value for the degree of correspondence being greater than a predefined threshold value.

* * * * *